Oct. 26, 1965   C. M. SWEET   3,213,910
WOOD SAWS WITH DUST CONVEYING SURFACES ON THE SIDES
Filed Jan. 29, 1962

INVENTOR.
Corlise M. Sweet
BY

United States Patent Office 3,213,910
Patented Oct. 26, 1965

3,213,910
WOOD SAWS WITH DUST CONVEYING
SURFACES ON THE SIDES
Corlise M. Sweet, 1000 E. Montana St., Milwaukee, Wis.
Filed Jan. 29, 1962, Ser. No. 169,369
8 Claims. (Cl. 143—133)

This invention relates to saws for cutting a thinner kerf in wood and is a continuation-in-part of the saws that were described in application Serial Number 848,452 filed October 23, 1959 and now abandoned.

In cutting boards from timbers and logs the present practice is for large saw mills to use band mills having wheels approximately six to eight feet in diameter and small saw mills use circular saws. The large band mills are difficult to move, they require very skilled men to maintain the wide blade, and they cut considerable saw dust because the blade is thick. The small saw mill can not afford to purchase the large band mill and employ a high salaried man to maintain the blades. They therefore use circular saws that cut a kerf that is approximately twice the thickness cut by the band mill. This is a great waste of lumber. One authority has stated the saw dust cut in this country is four to six billion board feet a year.

It is therefore an object of this invention to show a thinner saw that can be mounted on smaller size band mills that can be used by both the large and small saw mill.

A further object is to show that by having raised surfaces and grooves on both sides of the blade that the blade will require less clearance for saw dust and therefore the sides of the kerf will assist in guiding the blade and causing it to cut straighter.

Another object is to show that by placing the grooves on the blade at right angles to the edge of the blade the blade can bend more and thereby it can be used on band mills having smaller wheels.

A further object is to show that holes can be combined with grooves to carry the saw dust out of the kerf.

Another object is to show that a narrow scraping surface can be incorporated into the raised surface on the blade to reduce the friction in pulling the blade through the kerf.

A further object is to show that large saw mills can use several small band mills with thin blades instead of a large band mill with a thicker blade and thereby reduce saw dust waste.

Another object is to show how a thinner blade than now used can be used on reciprocating saws such as gang saws.

The accompanying drawings illustrate various embodiments of the invention and the several aspects contemplated to be the best mode of carrying out the invention.

Figure 2:
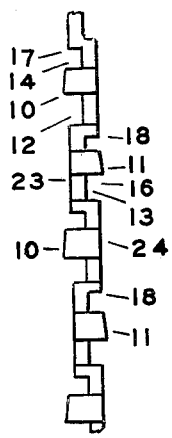
FIGURE 2 is a schematic edge view of the blade in FIGURE 1, looking at FIGURE 1 from the left side, showing in exaggerated width the bent teeth, the sharpened gullets, the grooves, and raised surfaces on the side of the blade.
Figure 1:
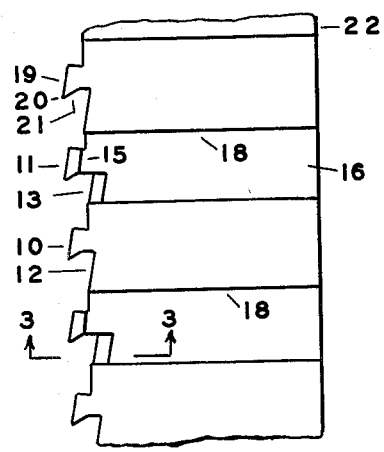
FIGURE 1 is a schematic outline in side elevation showing a blade with small bent teeth on one edge, sharpened gullets in front of the teeth and raised surfaces on the side of the blade that extend from the teeth to the back edge of the blade.
Figure 3:
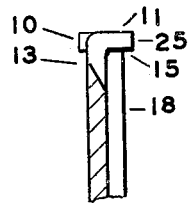
FIGURE 3 is a schematic section view through section 3—3 in FIGURE 1, showing a bent tooth and the sharpened gullet in front of the tooth.

The blade shown in FIGURES 1, 2 and 3 has small bent teeth 10 and 11. Teeth 10, in FIGURE 2, cut on the left of the blade and teeth 11 cut on the right side of the blade. In front of teeth 10 there are sharpened gullets 12 and in front of teeth 11 there are sharpened gullets 13. A sharpened gullet is shown in FIGURE 3. The saw dust cut by teeth 10 flows past the sharpened gullet 12, under the bent section of the tooth, and into the groove 14 which acts as a receptacle for the saw dust. The saw dust cut by teeth 11 flows past the sharpened gullet 13, under the bent section 15 of the tooth 11, and into the groove 16. On the trailing side of groove 14 there is an abutment surface 17, and on the trailing side of groove 16 there is an abutment surface 18. The abutment surfaces push the saw dust out of the kerf that is cut by the teeth 10 and 11.

The teeth 10 and 11 are tapered in the section 19 that is back of the cutting edge 20. The face of the tooth 21 is shown with a positive cutting angle. This combination has been found to cut wood easier than teeth with negative rake angles.

The grooves 14 and 16 and the abutment surfaces 17 and 18 are at right angles to the edge of the blade. The advantage to this is the blade can flex easier when traveling around wheels and it therefore can be used on smaller diameter band mill wheels.

It is the intention that the section of the blade in which the grooves are made will be thinner than a blade having conventional teeth. This can be done because the teeth 10 and 11 are smaller in size than the conventional teeth in wide band saws. Conventional saws must have large gullets in front of the teeth to hold the saw dust cut by the teeth. Inasmuch as the gullets in conventional wide band saws are large the teeth have to be large, and the blade must be thick to prevent the large teeth from bending at their base. The gullets 12 and 13 do not have to be large to hold the saw dust. Therefore the teeth 10 and 11 can be small and the blade 22 can be thinner than a conventional blade. The blade 22 being thinner it can flex more and be used on smaller diameter band mill wheels.

The blade shown in FIGURES 1 and 2 will not require as much clearance between the blade and the kerf as is required by conventional saws. In conventional band saws the thickness of the cutting edge on the teeth is approximately twice the thickness of the blade. One of the reasons this clearance is necessary is that saw dust spills out of the large gullets in conventional saws and lays between the smooth side of the blade and the rough surface on the kerf. The conventional saw does not have any means of carrying this saw dust out of the kerf; therefore the only way to prevent the saw dust from packing between the blade and the kerf is to cut a thick kerf that will provide ample space for the saw dust. In contrast to this the blade shown in FIGURES 1 and 2 has grooves 14 and 16 that extend from the teeth to the back edge of the blade. The abutment surfaces 17 and 18 on the trailing side of the grooves 14 and 16 act as flights on a conveyor and carry the saw dust out of the kerf that lays between the blade and the kerf. It is therefore believed that the blade in FIGURES 1 and 2 can be operated with less clearance and should be able to cut a straighter kerf. The reason the blade should cut straighter is that there being less clearance between the blade and the kerf the kerf will act as a guide for the blade and reduce the amount the blade can bend when the teeth in the saw come to a hard surface like a knot.

At this time it is not known how much less clearance the blade will require than a conventional blade. The amount of clearance will depend on the thickness of the chip cut and the specie of wood. It seems that for those interested in less clearance they should start with the distance across the teeth 10 and 11 to be sixty percent greater than the distance across the raised surfaces 23 and 24, and then gradually decrease the clearance.

Further reduction in the clearance between the blade and the kerf can be obtained by combining the blades shown here with the method of bending the board away from the blade that is described in Patent 3,089,524.

Another advantage of the blade is the bent tooth. A bent tooth as shown in FIGURES 2 and 3 allows the wood chip to flow under the tooth, in the space provided by the groove, and away from the cutting edge. The bent tooth also only cuts part of the width of the kerf. Cutting a smaller chip reduces the bending force on the wood fibers and there is less tendency for the wood fibers to be pulled apart when the tooth cuts the fibers. Another advantage of the bent tooth is the cutting edge is backed up by metal back of it and the cutting edge is also held from the side. A further advantage is the teeth being closer together than conventional saws the teeth cut a thinner chip. Cutting a thinner chip reduces the force to break the chip away from the sides of the kerf and there is less tendency for the wood fibers to be pulled apart. There is also the possibility that on some operations it may be possible to make the tooth sharper by decreasing the size of the angle that forms the cutting edge. That is, the angle between surfaces 19 and 21 would be smaller. The reason it appears the cutting angle can be sharper is the tooth cuts a thinner chip and the tooth is held from the side. A sharper tooth and a smaller chip would improve the appearance of the cut surface on some specie of wood. A further advantage that may be obtained from the bent tooth, on some soft species of wood, is to use the end of the bent tooth 25 to burnish the kerf as was explained in application Serial Number 70,474 filed November 21, 1960 and now Patent No. 3,129,735.

Figure 4:
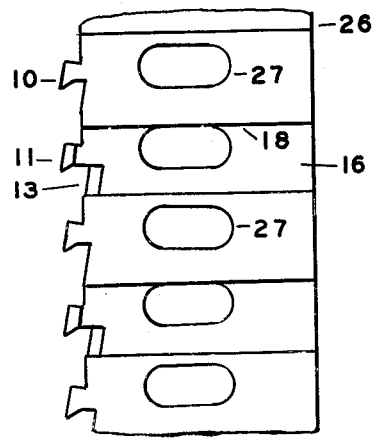
FIGURE 4 is a schematic outline of a saw in side elevation that is similar to FIGURE 1 with the exception that holes have been placed in the sides of the blade to assist in carrying the saw dust out of the kerf.

The blade 26 shown in FIGURE 4 is similar to the blade 22 shown in FIGURE 1, with the exception that holes 27 have been added. The advantage of the holes is that a larger space is provided to carry the saw dust out of the kerf.

Figure 6:
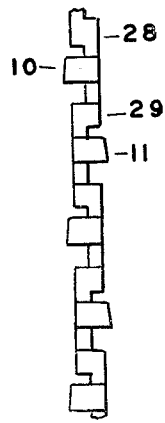
FIGURE 6 is a schematic edge view of the blade in FIGURE 5, looking at FIGURE 5 from the left side, showing the thicker section between the grooves.
Figure 5:
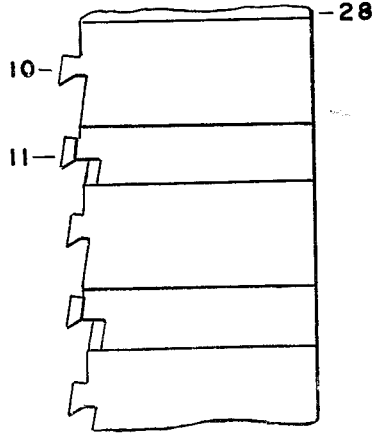
FIGURE 5 is a schematic outline of a saw in side elevation that is similar to FIGURE 1, the exception being that the metal connecting the raised surfaces on opposite sides of the blade has been made thicker.

The blade 28 shown in FIGURES 5 and 6 is similar to the blade shown in FIGURES 1 and 2. The difference is that the grooves have been made a little smaller and the thickness of the metal between the grooves 29 is larger. Increasing the thickness of the metal between the grooves, on some blades, will reduce the amount the blade will stretch when under tension.

Figure 7:
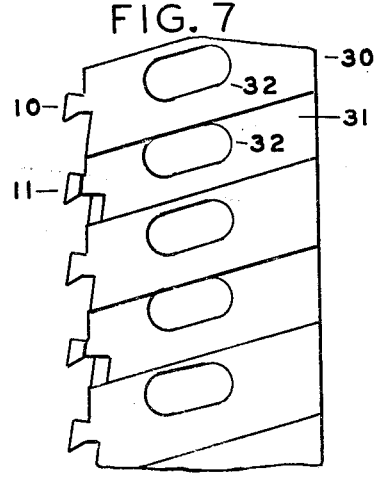
FIGURE 7 is a schematic outline of a blade in side elevation that is similar to the blade in FIGURE 4, the difference being that the raised surfaces and holes have been placed at an angle of less than ninety degrees with the edge of the blade.

The blade 30 shown in FIGURE 7 is similar to the blade shown in FIGURE 4. The difference is that the grooves 31 and the holes 32 have been placed at an angle of less than ninety degrees with the edge of the blade. The advantage to this arrangement is the saw dust will tend to flow toward the back of the blade thereby providing more space for the saw dust and reduce the packing of the saw dust between the sides of the blade and the kerf.

Figure 8:
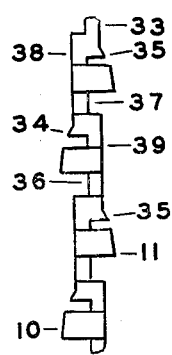
FIGURE 8 is a schematic edge view of a blade that is similar to the blade shown in FIGURE 6, the exception being that the raised surface has been made higher on the leading side thereby increasing the scraping action in conveying the saw dust out of the kerf.
Figure 9:
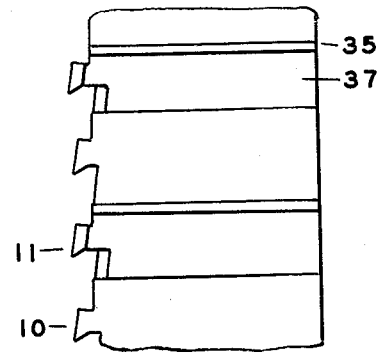
FIGURE 9 is a schematic side elevation of the blade in FIGURE 8, looking at FIGURE 8 from the right side, showing the bent teeth, the sharpened gullets, the raised surfaces and grooves on the side of the blade, and the section of the raised surface that has been made higher to increase the scraping action.

The blade 33 shown in FIGURES 8 and 9 is similar to the blade in FIGURES 5 and 6 with the exception that the abutment surfaces 34 and 35 have been increased in size over the abutment surfaces 17 and 18 shown in FIGURE 2. The advantage of this is to increase the amount of saw dust that the grooves 36 and 37 will carry out of the kerf and reduce the friction between the kerf and the raised surfaces 38 and 39 on the sides of the blade. Another advantage is because there is less clearance between the kerf and the surfaces 34 and 35 the blade can not bend as much in the kerf and the saw will cut straighter.

Due to the raised surfaces on the sides of the blade it seems that when the blade is used on a band mill it would be best to use a rubber composition covering over the wheel.

In conclusion it is believed that the combination of small teeth on the edge of the blade, and conveyor surfaces on the sides of the blade will reduce saw dust waste, cut a smoother surface on the board, and allow the use of less expensive thinner blades, and smaller machines.

Various embodiments of the invention may be employed within the scope of the accompanying claims which particularly point out and distinctly set forth the subject matter regarded as the invention.

I claim:
1. A saw for cutting boards from timbers and logs, comprising a blade for use in a power operated machine, said blade having alternate raised surfaces and grooves on both sides that extend from the front edge to the back edge of the blade, said blade having bent teeth on an edge, part of said teeth are bent towards one side of the blade and part are bent towards the opposite side of the blade, each of said bent teeth to extend from the bottom of a groove a small distance above the top, whereby said teeth cut wood chips from the center and side of the kerf that flow under the teeth and into a groove.

2. The blade in claim 1 in which the raised surfaces and grooves make an angle of approximately 90 degrees with the edge of the blade thereby making the blade more flexible for use on smaller diameter band mill wheels.

3. The blade in claim 1 in which the raised surfaces make an angle of less than 90 degrees with the edge of the blade thereby providing more space for saw dust by having the slanted surfaces push some of the saw dust towards the back of the blade.

4. The blade in claim 1 in which holes have been placed in the side of the blade to increase the amount of wood chips that can be conveyed out of the kerf by the blade.

5. The blade in claim 1 in which the gullets are sharpened thereby improving the flow of saw dust from the teeth to the grooves.

6. The blade in claim 1 in which the bent teeth have positive cutting angles thereby reducing the force to cut the wood and cutting a smoother surface on the board.

7. A saw for cutting thick sections of wood, comprising a blade for use on a band mill, said blade being a corrugated structure that has grooves alternating on opposite sides of the blade for carrying saw dust out of the kerf, said blade having teeth on an edge, said grooves extending from the toothed edge to the opposite edge of the blade, part of said teeth are bent towards one side of the blade and part are bent towards the opposite side of the blade, each of said teeth extending transversely over a groove in the blade to a point beyond the top of the groove whereby the saw dust cut by a tooth can flow directly into a groove.

8. A saw for cutting thick sections of wood, comprising a blade for use on a band mill, said blade being a corrugated structure that has grooves alternating on opposite sides of the beads for carrying saw dust out of the kerf, said corrugated structure having through holes on its sides whereby the saw dust carrying capacity of the blade is increased, said blade having teeth on an edge, said grooves extending from the toothed edge to the opposite edge of the blade, part of said teeth are bent towards one side of the blade and part are bent towards the opposite side of the blade, each of said teeth extending transversely over a groove in the blade to a point beyond the top of the groove whereby the saw dust cut by a tooth can flow directly into a groove and be carried out of the kerf by the combination of grooves and through holes.

References Cited by the Examiner

UNITED STATES PATENTS

| | | | |
|---|---|---|---|
| 495,345 | 4/93 | Junge et al. | 143—133 |
| 822,056 | 5/06 | Knox | 143—133 |
| 1,566,880 | 12/25 | Kelley | 143—133 |
| 2,622,636 | 12/52 | Cox | 143—135 |
| 2,725,906 | 12/55 | Markham. | |

FOREIGN PATENTS 11,891  1892  Great Britain.

DONALD R. SCHRAN, *Primary Examiner.*